United States Patent [19]

Koushiafes

[11] 4,174,205
[45] Nov. 13, 1979

[54] FURNACE AIR FILTER

[76] Inventor: Nicholas J. Koushiafes, P.O. Box 1543, Highland, Ind. 46322

[21] Appl. No.: 902,274

[22] Filed: May 3, 1978

[51] Int. Cl.² .............................................. B01D 46/00
[52] U.S. Cl. ......................................... 55/354; 55/501
[58] Field of Search ................................... 55/351–354, 55/385 G, 496, 501, 511; 160/239; 225/46

[56] References Cited

U.S. PATENT DOCUMENTS

| 391,379 | 10/1888 | Mitchamore | 225/46 |
| 1,830,364 | 11/1931 | Knudson | 55/354 |
| 2,230,908 | 2/1941 | Reiman | 160/239 |
| 2,722,993 | 11/1955 | Gerber et al. | 55/354 |
| 3,337,898 | 8/1967 | Schmid et al. | 55/354 |
| 3,413,782 | 12/1968 | Bartlett | 55/521 |
| 3,710,588 | 1/1973 | Martinez | 55/354 |
| 3,989,175 | 11/1976 | Cherrin | 225/46 |

Primary Examiner—Bernard Nozick
Attorney, Agent, or Firm—Sabin C. Bronson

[57] ABSTRACT

An improved apparatus for filtering an air flow which is warmed or cooled and used for heating or cooling purposes, comprises a filter frame defining a filter area and a filter medium supply source located in proximity to the frame, wherein the frame and supply source cooperate so that the filter medium which is removed from the filter area is replaced by filter medium from the supply source.

6 Claims, 3 Drawing Figures

U.S. Patent  Nov. 13, 1979  4,174,205
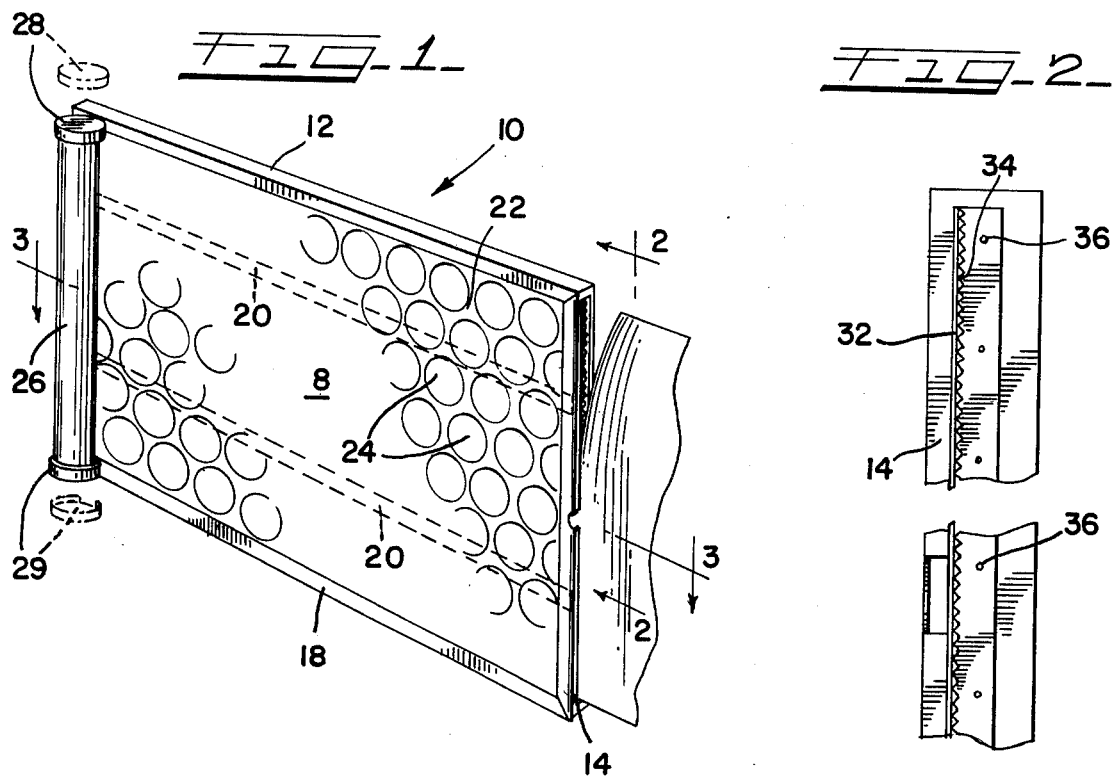
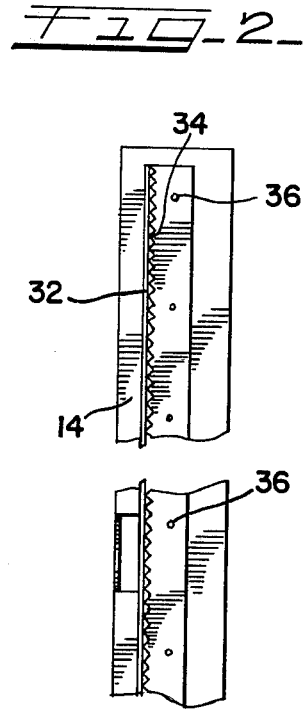
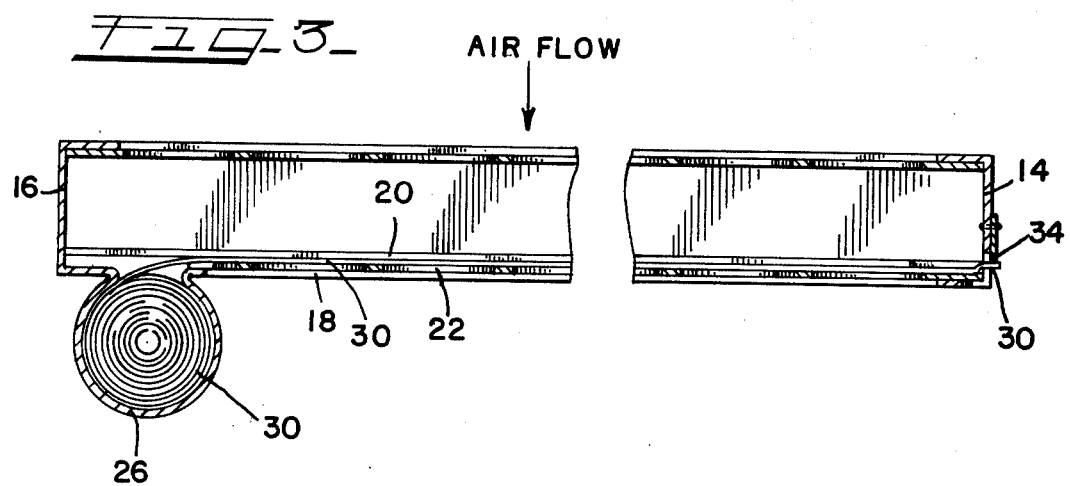

FURNACE AIR FILTER

BACKGROUND AND SUMMARY OF THE INVENTION

The present invention relates to an improved apparatus for removing solid material or contaminants from an air stream. More particularly, this invention relates to an improved apparatus for removing or filtering solid contaminants from an air stream which is subjected to heat exchange to produce air useful for heating or cooling purposes.

Many residential housing units and other buildings are heated or cooled by the circulation of air through a heating furnace or cooling unit, where the air is warmed or cooled by heat exchange. The air is then passed to the room or rooms which it is desired to heat or cool. At least a portion of the air may be recycled between the plant and the area to be heated, or cooled several times, with make-up air being added as desired.

In order to insure efficient heating and cooling plant operation, one or more furnace filters are placed in the path of the air flow which is subjected to heat exchange in the plant to remove solid material or contaminants from the air. Without such filters, the heat exchange surfaces of the heating or cooling plant would tend to become coated with such solid material and become less effective.

One problem with conventional "throw-away" filters of the type described above is the frequent changing of the entire filter, including frame. Not only are such replacement filters expensive, but they also take up valuable storage space. Other filters can be washed and are thus reusable. However, such washing is a tedious and somewhat dirty job.

Therefore, one object of the present invention is to provide an improved apparatus for removing solid material from the furnace air flow.

Another object of this invention is to provide an improved apparatus for removing solid material from an air flow which is subjected to heat exchange and which apparatus is easily maintained for efficient removal of solid material. Other objects and advantages of the present invention will become apparent hereinafter.

An improved apparatus for removing solid material from air which is subjected to heat exchange to produce air useful for heating or cooling purposes has now been discovered. This apparatus comprises a filter frame means which defines a filter area preferably a substantially rectangular area, through which at least a portion of the air stream flows; and a supply means located in proximity to the frame means to supply filter medium to the filter area. The filter medium is constructed to remove at least a portion of the solid material, such as dust, lint and the like, entrained in the air flow as the air flows through the filter area. The filter frame means and the supply means co-operate so that the filter medium which is removed from the filter area is replaced by filter medium from the supply means. That is, for example, as the filter medium in the filter area becomes ineffective because of prolonged use and/or excessive contamination with solid material, it is removed from the filter area and replaced by fresh filter medium from the supply means. The simplified removal and replacement of filter medium in the present apparatus provides for improved filtration effectiveness, ease of operation, and maintenance, without the necessity of replacing the entire filter frame means every time the filter medium in the filter area is to be changed.

In one preferred embodiment, the present apparatus further comprises cutting means located at or near at least one end of the frame means to cut the filter medium being removed from the filter area from filter medium within the filter area. This embodiment is particularly applicable where the filter medium, such as paper, cloth, porous metal, foil, porous resineous foam and the like, in the filter area is attached to the filter medium in the supply means. The filter medium in the filter area is removed by uging this filter medium toward the end of the frame means equipped with the cutting means. As the filter medium is pulled from the filter area, it is replaced by fresh filter medium from the supply means. After the desired amount of filter medium is pulled from the filter area, the cutting means is employed to separate the removed filter medium from the medium in the filter area. This cycle can be repeated as often as necessary for efficient air stream filtration.

In another preferred embodiment, the present apparatus further comprises porous support means located in the filter area, preferably attached to the frame means, which acts to support the filter medium in the filter area. One particularly preferred construction of the porous support means involves two support members, each preferably attached to the frame means, situated in the filter area so that the filter medium in the filter area is positioned between the support members. This construction has been found to provide optimal support for the filter medium in the filter area without unduly interfering with the operational efficiency of the entire filter assembly.

The present supply means is preferably removably attached to the frame means at or near one of the ends of the frame. In one preferred embodiment in which a cutting means is employed, the supply means is attached to the frame means at or near the end of the frame means, substantially opposite the end of the frame means at or near which the cutting means is located. In this manner the supply means can supply filter medium to substantially the entire filter area and the removed filter medium can be effectively and efficiently detached from the filter medium in the filter area. In an additional embodiment, the present supply means is constructed so as to allow a quantity of fresh filter medium to be included therein after the supply of filter medium in the supply means is exhausted. For example, when the supply means is empty, a fresh supply of filter medium may be added so that filter medium may continue to be supplied to the filter area. Thus, prolonged periods of time and/or many changes of filter medium may occur without requiring the replacement of the filter frame or, for that matter, any other component of the present apparatus.

These and other aspects and advantages of the present invention are set forth in the following detailed description and claims, particularly when considered in conjunction with the accompanying drawings in which like parts bear like reference numerals.

BRIEF DESCRIPTION OF THE DRAWINGS

FIG. 1 is a perspective view of one embodiment of the present filter assembly.

FIG. 2 is a cross sectional view taken along line 2—2 of FIG. 1.

FIG. 3 is a side elevational view taken along line 3—3 of FIG. 1.

DESCRIPTION OF THE PREFERRED EMBODIMENT

Referring now to the drawings, a filter assembly is shown generally at 10. The filter assembly 10 may be placed in a conduit which carries air to or from a heat exchange system, e.g., furnace or air conditioner, to heat or cool the air prior to being used for heating or cooling purposes. The filter assembly 10 may be located either upstream or downstream from the heat exchange system, with upstream being preferred in order to maximize the protection of the heat exchange system by the filter assembly 10.

Filter assembly 10 includes top member 12, side members 14 and 16 and bottom member 18, which together define an enclosed area 8. A sheet 22 is located within enclosed area 8 and is firmly affixed to top member 12, side members 14 and 16 and bottom member 18. The sheet 22 has a series of holes 24. Two support guides 20, extend between side members 14 and 16 and are attached thereto.

Attached to an extension of side member 16 is a tubular member 26 which is situated so as to be open to the enclosed area 8 for reasons which will be detailed hereinafter. Tubular member 26 is associated with top end cap 28 and with bottom end cap 29. Both top end cap 28 and bottom end cap 29 are detachable as illustrated in FIG. 1. Tubular member 26 also may be made detachable from side member 16 by attaching tubular member 26 to side member 16 using conventional means.

In any event, tubular member 26 is designed to hold a supply roll of filter paper 30. Tubular member 26 is open toward enclosed area 8 so that filter paper 30 from within tubular member 26 can be placed in enclosed area 8 between sheet 22 and support guides 20. Sheet 22 and support guides 20 act to support filter paper 30 in place in the enclosed area 8.

Side member 14 is equipped with a lengthwise slot 32 designed to permit the passage of filter paper 30 from enclosed area 8. Side member 14 is also equipped with a lengthwise saw-edge 34 which is attached to side member 14 at 36. Saw-edge 34 is situated and designed to cut the filter paper 30 pulled through slot 32 from the filter paper 30 in enclosed area 8.

Filter assembly 10 functions as follows: A fresh supply of filter paper 30 is provided in tubular member 26 by removing top end cap 28 and inserting a roll of filter paper 30. Filter paper 30 from tubular member 26 is manually fed between sheet 22 and support guides 20 toward side member 14 so as to cover substantially the entire enclosed area 8.

In this configuration, the filter assembly 10 is put into service in a furnace for removing solid material from the air flow ultimately used for heating or cooling purposes.

After a period of time in such service the filter paper 30 inside enclosed area 8 and exposed to the flow of air becomes dirty and requires replacement. This replacement is accomplished by pulling the filter paper in enclosed area 8 through slot 32 in side member 14. Sufficient filter paper 30 is passed through slot 32 so that fresh filter paper 30 from tubular member 26 covers the entire enclosed area 8. The used filter paper 30 passing through slot 32 is torn from the filter paper 30 within enclosed area 8 by means of saw-edge 34. With the fresh filter paper 30 in place, the filter assembly 10 is returned to service.

Either end cap 28 or end cap 29 may be removed periodically to check on the remaining supply of filter paper 30 in tubular member 26. When the supply of filter paper 30 in tubular member 26 is exhausted, a fresh supply of filter paper 30 is inserted into tubular member 26 as noted above.

As illustrated, filter assembly 10 can be used indefinitely without complete replacement. Substantial time, storage space and money may be saved by using the present apparatus in which only the filter medium, e.g., filter paper 30, requires replacement when the filter assembly 10 becomes dirty.

While this invention has been described with respect to various specific examples and embodiments, it is to be understood that the invention is not limited thereto and that it can be variously practiced within the scope of the following claims.

Having thus described my invention, what I claim and desire to secure by Letters Patent is:

1. An apparatus for removing solid material from an air stream which is subjected to heat exchange to produce air useful for heating or cooling purposes, said apparatus comprising: filter frame means defining a filter area through which said air flows, supply means located in proximity to said frame means to supply filter medium to said filter area, said medium being constructed to remove solid material from said air stream as said air stream flows through said filter area, said filter frame means and said supply means co-operating so that filter medium which is removed from said filter area is replaced by filter medium from said supply means, and a cutting edge attached to one end of said frame means to cut filter medium being removed from said filter area from filter medium within said filter area.

2. The apparatus of claim 1 which further comprises support means attached to said frame means and acting to support said filter medium in place while said filter medium is in said filter area.

3. The apparatus of claim 1 wherein said supply means is attached to said frame means near the end of said frame means substantially opposite the other end of said frame means where said cutting means is located.

4. The apparatus of claim 1 wherein said supply means is constructed so as to allow a quantity of filter medium to remain in the filter area after the supply of filter medium in said supply means becomes exhausted.

5. The apparatus of claim 4 which further comprises porous support means attached to said frame means and acting to support said filter medium in place while said filter medium is in said filter area, said porous support means including two support members situated so that said filter medium in said filter area is positioned between said support members.

6. The apparatus of claim 5 wherein said filter frame means defines a substantially rectangular filter area.

* * * * *